(12) United States Patent
Hu et al.

(10) Patent No.: US 7,925,741 B2
(45) Date of Patent: Apr. 12, 2011

(54) BLACK-BOX HOST STACK LATENCY MEASUREMENT

(75) Inventors: Xiao Hu, Shanghai (CN); Young Guo, Shanghai (CN); Xiaolu Ye, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 958 days.

(21) Appl. No.: 11/769,619

(22) Filed: Jun. 27, 2007

(65) Prior Publication Data

US 2009/0006688 A1    Jan. 1, 2009

(51) Int. Cl.
*G06F 15/173*  (2006.01)

(52) U.S. Cl. .................... 709/224; 709/204; 709/232

(58) Field of Classification Search .............. 709/203, 709/224, 232

See application file for complete search history.

(56) References Cited

U.S. PATENT DOCUMENTS

| | | | |
|---|---|---|---|
| 7,319,847 B2 * | 1/2008 | Xanthos et al. | 455/67.11 |
| 7,765,294 B2 * | 7/2010 | Edwards et al. | 709/224 |
| 2008/0052394 A1 * | 2/2008 | Bugenhagen et al. | 709/224 |
| 2009/0006688 A1 * | 1/2009 | Hu et al. | 710/107 |

* cited by examiner

*Primary Examiner* — Michael Won
(74) *Attorney, Agent, or Firm* — Blakely, Sokoloff, Taylor & Zafman LLP

(57) ABSTRACT

A method comprises sniffing an input from a client device to a host device and an output from the host device to the client device; recording a first time parameter in response to a characteristic data unit being inserted into the input that is outputted from a host stack of a host device; recording a second time parameter in response to the output that comprises the characteristic data unit being received by the host stack; and measuring a latency based on the first time parameter, the second time parameter and arrival time of the input and the output at a sniffing point.

20 Claims, 4 Drawing Sheets

BLACK-BOX HOST STACK LATENCY MEASUREMENT

BACKGROUND

In some systems that involve real time user interactions, e.g., a gaming system, latency may be an indicator to show how a game impacts a user's experience. In order to develop these systems, one way may improve accuracy of latency measurement. In a networked host-client system, if the whole system latency is unacceptable, it may be necessary to measure the latency caused by host hardware/software with desired accuracy. Some white-box approaches may be used for the latency measurement. And, some sniff tools may be used in some areas such as network analysis. However, these methods may not achieve desired accuracy.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to provide a black box method to measure host stack latency of a host computing device of a host-client system. The implementation of the techniques is not restricted in computing systems; it may be used by any execution environments for similar purposes, such as, for example, other host-client systems that may involve real time user interactions. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

Figure 1:
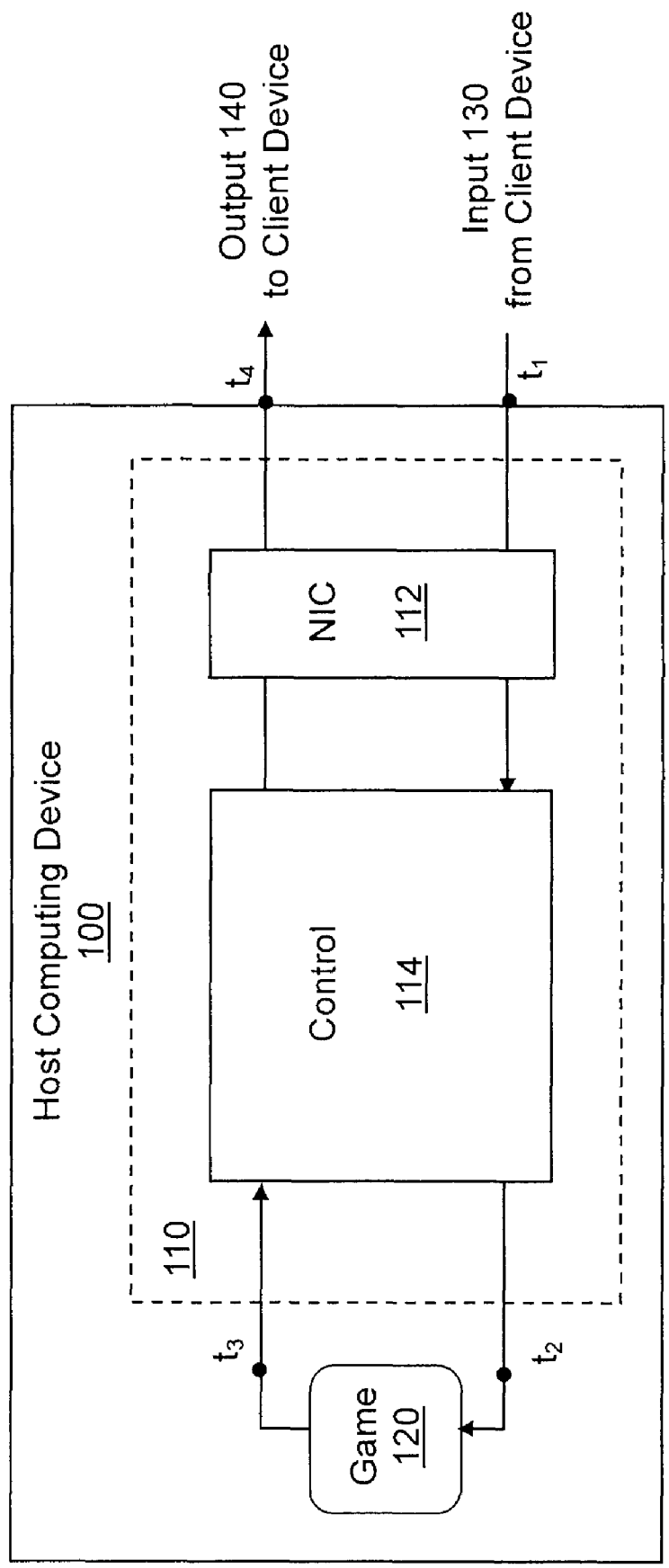
FIG. 1 is a schematic diagram of an embodiment of a host computing device that may comprise a host stack.

FIG. 1 shows an example embodiment of a host computing device 100. In one embodiment, the host computing device 100 may comprise a remote gaming (RG) host stack 110. While FIG. 1 utilizes the RG host stack 110 as an example, some embodiments may utilize any other devices that may involve real time user interactions. In one embodiment, the RG host stack 110 may separate and redirect game input and/or output between the host computing device 100 and a client device such as client digital media adapter (DMA) 208 of FIG. 2 through a network, to enable game players and users of the host computing device 100 to share the host computing device 100 at the same time.

Figure 2:
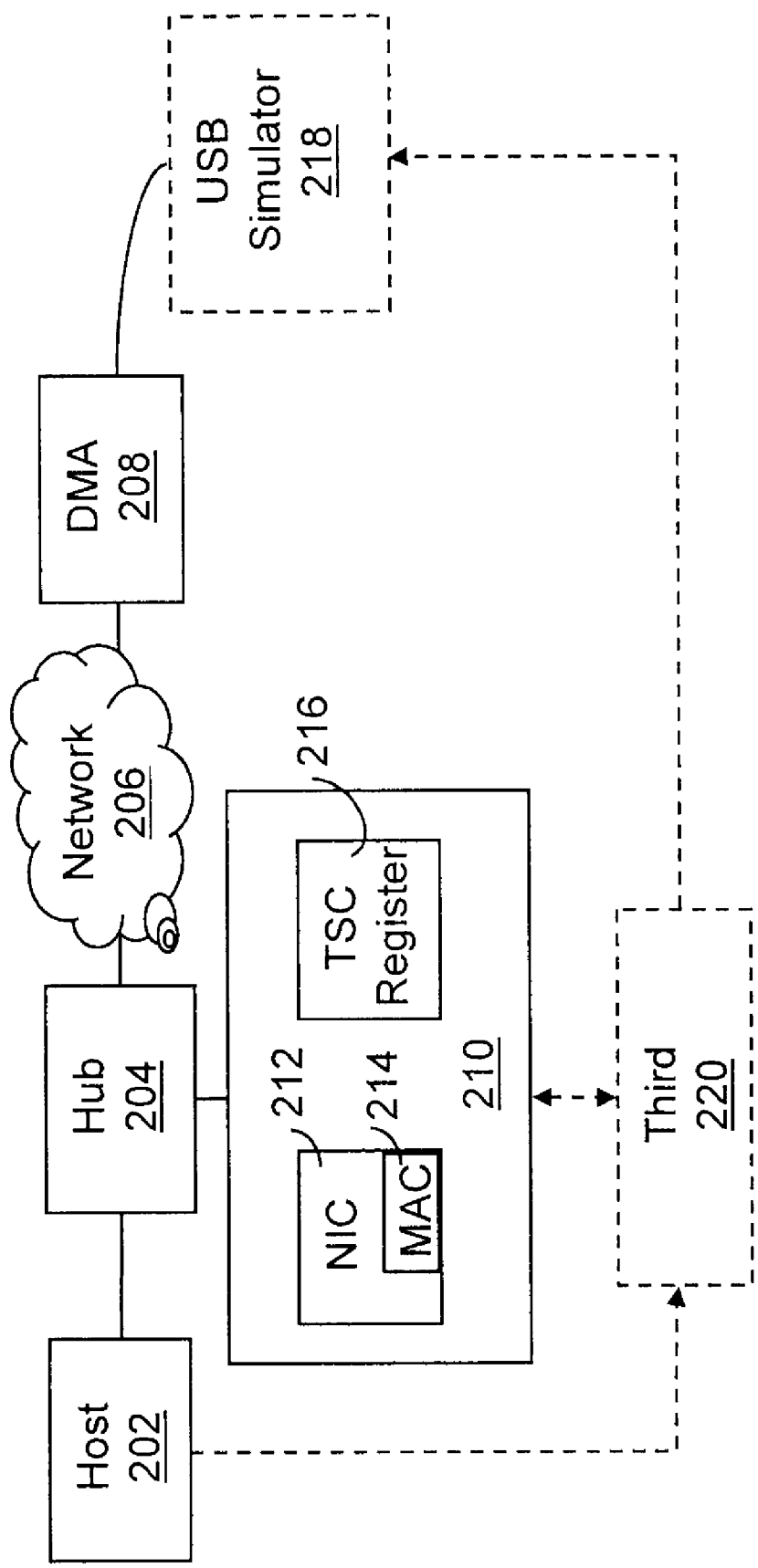
FIG. 2 is a schematic diagram of an embodiment of a system that may be used to measure latency of the host stack of FIG. 1.

In one embodiment, the RG host stack 110 may comprise a network interface card (NIC) 112 to couple the RG host stack 110 to the network such as a network 206 of FIG. 2; however, in some embodiments, any other network interfacing devices may be utilized to couple the host RG host stack 100 to the network 206. Referring to FIG. 1, the host computing device 100 may receive an input 130 from the client device and transmit an output 140 to the client device through NIC 112. The RG host stack 110 may further comprise a control unit 114 to provide control in the RG host stack 110.

Gaming software 120 may be provided in the host computing device 100.

FIG. 1 further illustrates four parameters $t_1$, $t_2$, $t_3$, and $t_4$ that may each represent the time when the corresponding data arrives at the respective point. In one embodiment, the host stack latency may be evaluated as $(t_2-t_1)+(t_4-t_3)$ or $(t_4-t_1)+(t_2-t_3)$. In one embodiment, $t_1$ may represent a time when the input 130 arrives at the host computing device 100, e.g., at NIC 112, $t_2$ may represent a time when the input 130 is outputted from the RG host stack 110 to arrive at the gaming software 120, $t_3$ may represent a time when the output 140 provided by gaming software 120 arrives at the host stack 110, and $t_4$ may represent a time when the output 140 is outputted from the host computing device 100. While FIG. 1 illustrates a host computing device that may provide a remote gaming system, in some embodiments, any other host device may be utilized.

FIG. 2 illustrates an example embodiment of a system that may measure latency of the RG host stack 110. As shown in FIG. 2, a second computing device 210 may be inserted into the network 206 that may be coupled between a host computing device 202 and a DMA 208 through a hub 204. In one embodiment, the second computing device 210 may sniff signals or information transmitted on the network 206 via the hub 204. For example, the second computing device 210 may comprise a network interface card (not shown) that may be set to a promiscuous mode to enable the second computing device 210 to capture one or more packets transmitted between the host computing device 202 and DMA 208 via the network 206.

Figure 3:
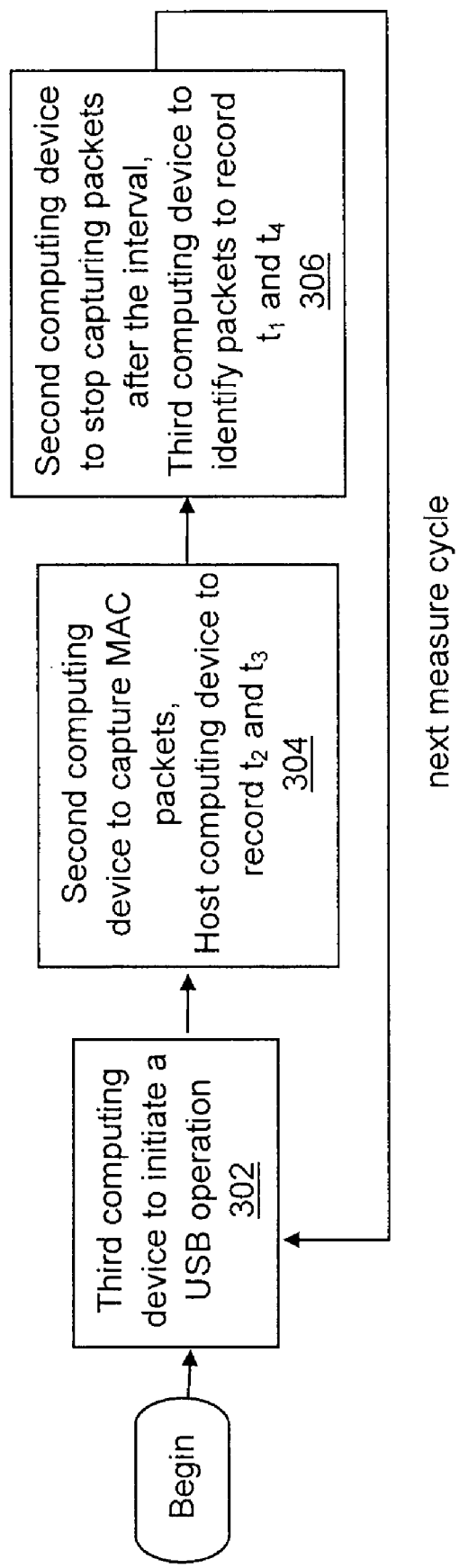
FIG. 3 is a schematic diagram of a method that may be used to measure the latency of the host stack of FIG. 1.

Referring to FIG. 2, it is illustrated a third computing device 220 that may initiate a flow of FIG. 3 to measure host stack latency of the host computing device 202. With reference to FIG. 3, in one embodiment, the third computing device 220 may control or drive a universal serial bus (USB) simulator 218 that may simulate a USB device to generate a USB operation (block 302). In another embodiment, the USB simulator 218 may be omitted and a USB operation may be generated manually by a user through a USB device (not shown). In one embodiment, DMA 208 may provide a remote USB (RUSB) packet, in response to the USB operation from the USB simulator 218. In block 304, the second computing device 210 may capture e.g., at NIC 212 one or more packets that are transmitted between DMA 208 and the host computing device 202 via the hub 204. The second computing device 210 may record arrival time of each packet that may reach the second computing device 210.

For example, in response to the second computing device 210 capturing at NIC 212 the RUSB packet from DMA 208 to the host computing device 202 on the network 206, the time when the RUSB packet arrives at NIC 212 may be recorded. In one embodiment, the arrival time of the RUSB packet may be represented by $t_1+\Delta t$, wherein $\Delta t$ may represent a first delay between the time when the RUSB packet arrives at NIC 212 and the time when the RUSB packet is captured by sniff software of the second computing device 210. In one embodiment, it may be assumed that network transmission time may be negligible, if the second computing device 210 is placed in proximity to the network 206.

In one embodiment, in order to eliminate an impact of a fluctuation in $\Delta t$ on the whole measurement, a sniffing point may be set in proximity to a physical layer of the second computing device 210. For example, the sniffing point may be set at an operating system layer or any other lower layer, e.g., basic operation layer. In another example, media access control (MAC) driver 214 of the NIC 212 may be utilized. For example, MAC layer of the second computing device 210, e.g., an interrupt handler of the MAC driver 214 may be modified to capture MAC packets that may correspond to data or a stream on the network 206. In another embodiment, the second computing device 210 may capture at the MAC driver 214 one or more MAC packets that may correspond to the RUSB packet transmitted to the host computing device 202 from DMA 208 and/or mobile picture expert group (MPEG) 2 stream outputted from the host computing device 202 to DMA 208.

In another embodiment, the MAC driver 214 may be utilized or modified to call system time of the second computing device 210. For example, the MAC driver 214 may generate an instruction, e.g., rdtsc, to access a time stamp counter (TSC) register 216 and read a cycle number of the second computing device 210 to track down packet arrival time of each packet.

Referring to FIG. 3, in block 304, the host computing device 202 may poll inputs to the gaming software 120 and record time $t_2$ in response to the RUSB packet arriving at gaming software 120. The host computing device 202 may further hook, e.g., an interface of the control 114 in the host computing device 202 to insert a black frame into a graphic input to the gaming software 120 at time $t_2$. In one embodiment, the host computing device 202 may be programmed to run a first light-weight application to poll the inputs, record $t_2$ and insert the black frame; however, in some embodiments, any other software, hardware, firmware or any combination thereof may be utilized.

Referring to FIG. 3, in block 304, the host computing device 202 may poll outputs, e.g., graphic outputs, from the gaming software 120 and record time $t_3$ in response to the black frame being received from the graphic outputs from the gaming software 120.

In one embodiment, the host computing device 202 may be programmed to run a second light-weight application to find the black frame and record $t_3$; however, in some embodiments, any other software, hardware, firmware or any combination thereof may be utilized. The black frame may be captured, encoded, and rendered into a MPEG2 stream by the control 114 of the host computing device 202, and may be transmitted to DMA 208 through the network 206.

In another embodiment, in response to the second computing device 210 capturing one or more MAC packets corresponding to the black frame that is outputted from the host computing device 202, the time when the MAC packets arrive at NIC 212 may be recorded in the same manner as that is used to measure the arrival time of the RUSB packet from DMA 208. The arrival time of the MAC packets corresponding to the black frame may be represented by $t_4+\Delta t'$. For example, $\Delta t'$ may represent a second delay between the time when the MAC packets arrives at NIC 212 and the time when the packets are captured by sniff software of the second computing device 210. As mentioned above, each of the first delay $\Delta t$ and the second delay $\Delta t'$ may cover a time span from the physical layer, e.g., the NIC 112 to the MAC layer, e.g., the MAC driver 214. It may be assumed that the first delay $\Delta t$ equals to the second delay $\Delta t'$ or they are approximately equivalent. Thus, if $(t_4+\Delta t')-(t_1+\Delta t)$ is calculated, the two delays may be eliminated and the time $(t_4-t_1)$ may be obtained. Since $(t_4-t_1)$, $t_2$, and $t_3$ may be obtained as above mentioned, the host stack latency may be derived from the expression $(t_4-t_1)+(t_2-t_3)$.

In one embodiment, the second computing device 210 may not need to identify the packets to be sniffed. For example, the second computing device 210 may capture all the MAC packets transferred along the network 206. In another embodiment, in order to facilitate analysis, a next USB input may not be generated by the USB simulator 218 until the black frame is captured by the second computing device 210. In another embodiment, an interval between two consecutive USB inputs may be set to be equal to or longer than a threshold, e.g., 1 second. Referring to FIG. 3, the second computing device 210 may stop capturing packets or the sniff operation after the interval (block 306).

In block 306, the third computing device 220 may identify a first set of one or more MAC packets that correspond to the RUSB input packet and a second set of MAC packets that correspond to the black MPEG2 frame from the MAC packets captured by the second computing device 210. In one embodiment, each set of packets may have an encoding scheme. For example, the first set of MAC packets may each comprise a string, such as "RUSB", following a TCP (Transmission Control Protocol) header to indicate the RUSB packet. In another example, the second set of MAC packets may each comprise a string that continually occurs in data segment following a MPEG 2 header.

The third computing device 220 may identify the two set of packets at MAC layer 214 based on the encoding schemes and two cycle numbers that each may correspond to the arrival time of the two set of packets at the MAC layer 214. Each cycle number may be multiplied by the time that corresponds to a machine cycle to obtain time $t_1+\Delta t$ and $t_4+\Delta t'$. In one embodiment, the third computing device 220 may operate offline; however, it may not be required. While FIG. 2 illustrates the third computing device 220, in some embodiments, the third computing device 220 may be omitted and the operations thereof may be performed by the second computing device 210. Referring to FIG. 3, a next measure cycle may begin after the time $t_1$ and $t_4$ is obtained. In another embodiment, each measure cycle may begin on a periodic basis.

While the flow of FIG. 3 is illustrated as a sequence of operations, in some embodiments, the illustrated operations of the flow may be performed in a different order. For example, the third computing device 220 may identify the desired packets at the same time the packets have been captured. In another embodiment, the next measure cycle may be initiated after the end of the interval. In another embodiment, while the flow of FIG. 3 illustrates to use a black frame to measure host stack latency of a remote gaming system, in some embodiments, e.g., any other characteristic data unit may be utilized to measure stack latency of any other host devices. While FIG. 3 illustrates generating an RUSB operation to provide a RUSB packet, in some embodiments, any other operation may be utilized to provide a characteristic data unit.

Figure 4:
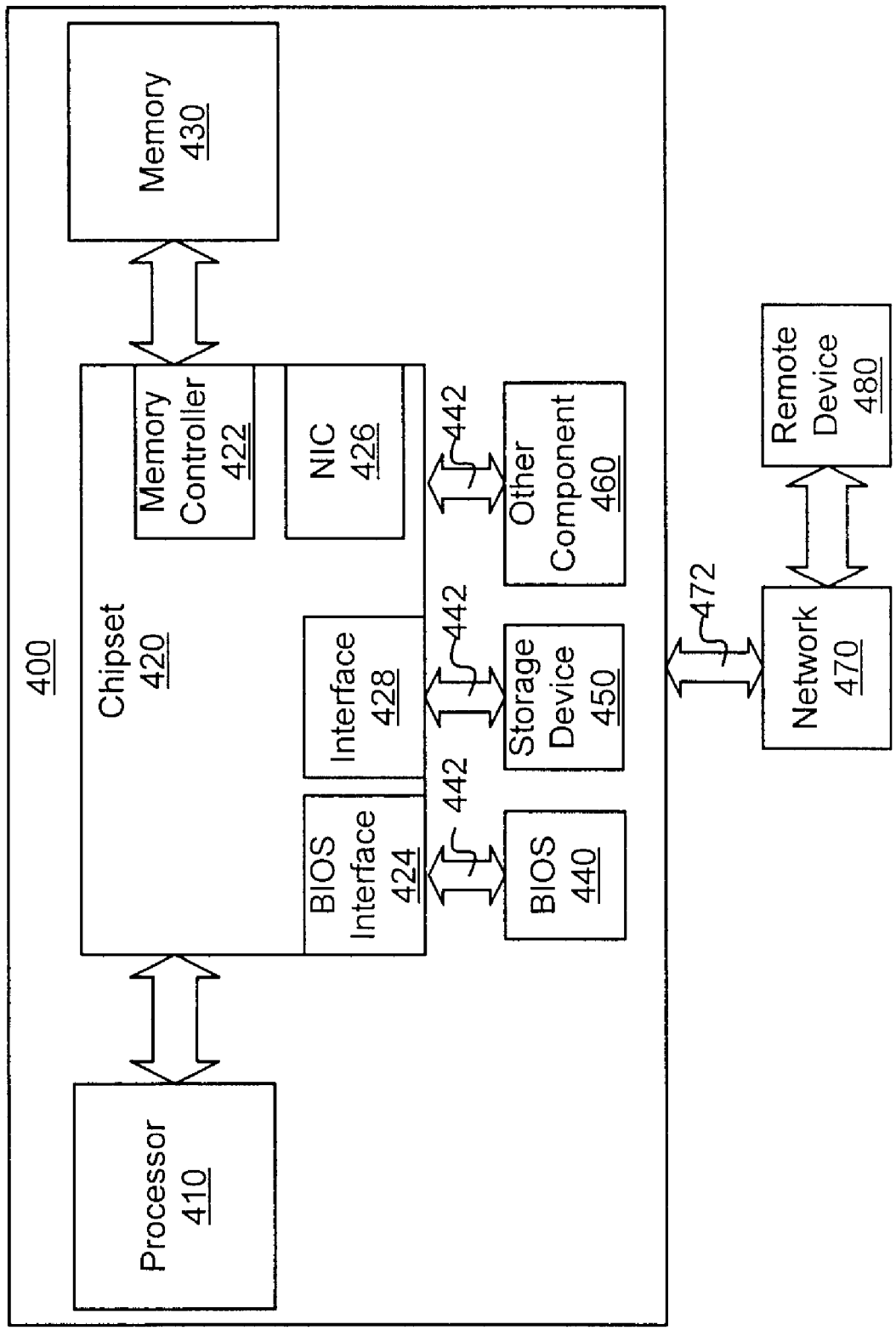
FIG. 4 is a schematic diagram of an embodiment of a computing device.

FIG. 4 illustrates an embodiment of a computing device 400. In one embodiment, the computing device 400 may be used to provide any of the host computing device 202, the second computing device 210 and the third computing device 220. The computing device 400 may comprise one or more processors 410. The processor 410 may perform actions in response to executing instructions. For example, the processor 410 may executes programs, perform data manipulations and control tasks in the computing device 400, etc. The processor 410 may be any type of processor adapted to perform operations in memory 430. For example, processor 410 may be a microprocessor, a digital signal processor, a microcontroller, or any other processors. In one embodiment, the processor 410 may be not dedicated to the use of memory 430, and the processor 410 may perform operations in memory 430 while also performing other system functions.

The memory 430 may comprise memory devices providing addressable storage locations that a memory controller 422 may read data from and/or write data to. The memory 430 may comprise one or more different types of memory devices such as, for example, dynamic random access memory (DRAM) devices, synchronous dynamic random access memory (SDRAM) devices, read-only memory (ROM) devices, or any other volatile or non-volatile memory (NVM) devices. In another embodiment, the memory 430 may be arranged in channels, ranks, banks, pages, and columns.

The computing device 400 may further comprise a chipset 420. The chipset 420 may comprise one or more integrated circuit packages or chips that may couple the processors 410 to memory 430, Basic Input/Output System (BIOS) 440, one or more storage devices 450, and other components (for example, mouse, keyboard, video controller, or other I/O devices of the computing device 400, etc.). The chipset 430 may receive transactions from the processors 410 and to issue transactions to the processors 410 via a processor bus. The memory controller 422 may issue transactions to the memory 440 via a memory bus. The chipset 430 may comprise a BIOS interface 424 that may access the BIOS 440 via a bus 142. The chipset 430 may further comprise NIC 426 that may couple the computing device 400 to a remote device 480 via a network 470; however, in some embodiments, any other interface or interface device may be utilized.

In another embodiment, the storage device 450 may store information, such as code, programs, files, data, applications, or operating systems, etc. An example of the storage device 450 may comprise a tape, hard disk (HD) drive, a floppy diskette, a compact disk (CD) ROM, a flash memory device, any other mass storage device, any other magnetic storage media, any other optical storage media, any other non-volatile memory devices, etc. The chipset 420 may comprise one or more storage device interfaces 428 that may access each storage device 450 via a bus 442.

Further, while the embodiments of FIGS. 1, 2 and 4 are illustrates to comprise a certain number of devices, some embodiments may apply to a different number. Although the above mentioned embodiments may measure host stack latency in a remote gaming system, in some embodiments, these embodiments may be further utilized to measure stack latency in any other host or client systems.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A method comprising:
sniffing an input from a client device to a host device and an output from the host device to the client device;
recording a first time parameter in response to a characteristic data unit being inserted into the input that is outputted from a host stack of a host device;
recording a second time parameter in response to the output that comprises the characteristic data unit being received by the host stack; and
measuring a latency based on the first time parameter, the second time parameter and arrival time of the input and the output at a sniffing point.

2. The method of claim 1, comprising:
providing a computing device in a network between the host device and the client device to sniff the input and the output, and
setting the sniffing point in proximity to a physical layer of the computing device.

3. The method of claim 1, comprising:
setting the sniffing point at a media access control driver of a computing device to capture one or more media access control packets that each corresponds to one of the input and the output.

4. The method of claim 1, comprising:
calling system time of the sniffing point to track down the arrival time of the input and the output.

5. The method of claim 1, wherein the characteristic data unit comprises a black frame.

6. The method of claim 1, comprising:
initiating a remote universal serial bus operation to provide the input that comprises a remote universal serial bus packet.

7. The method of claim 5, comprising:
recording the arrival time of the input in response to capturing a packet that corresponds to a remote universal serial bus packet of the input; and
recording the arrival time of the output in response to capturing a packet that corresponds to the black frame in the output.

8. The method of claim 1, comprising:
accessing a time stamp counter register to track down arrival time of one or more packets at the sniffing point, wherein each packet corresponds to one of the input and the output.

9. A system, comprising:
a host device that is coupled to a client device via a network; and
a computing device that is inserted in the network between the host device and the client device to sniff an input to the host device from the client device and an output from the host device to the client device, record a first time parameter in response to a characteristic data unit being inserted into the input that is outputted from a host stack of a host device, record a second time parameter in response to the output that comprises the characteristic data unit being received by the host stack, and measure a latency of the host device based on the first time parameter, the second time parameter and arrival time of the input and the output at the computing device.

10. The system of claim 9, wherein the computing device comprises:
a network interfacing device that comprises a media access control driver to capture one or more media access control packets that each corresponds to one of the input and the output.

11. The system of claim 9, wherein the computing device comprises:
a register to count system time of the computing device; and
a media access control driver to access the register to track down packet arrival time of one or more packets that each corresponds to one of the input and the output.

12. The system of claim 9, wherein the host device to execute instructions that result in the following:
in response to the input arriving at gaming software of the host device, recording a first time parameter associated with the latency and inserting a black frame into the input.

13. The system of claim 12, wherein the host device to execute instructions that result in the following:
recording a second time parameter associated with the latency in response to the gaming software outputting the output that comprises the black frame.

14. The system of claim 9, wherein the computing device comprises:
a media access control layer to capture a first set of one or more packets that corresponds to a remote universal serial bus packet in the input and a second set of one or more packets that corresponds to a characteristic data unit inserted by the host device in the input,
wherein the computing device measures the latency based on the time when the media access control layer captures each of the first set of packets and the second set of packets.

15. The system of claim 9, wherein the computing device captures information between the host device and the client device and identifies from the information the input and the output based on a characteristic string in each of the input and the output.

16. A non-transitory machine readable medium comprising:
a plurality of instructions that in response to being executed result in a computing device sniffing an input from a client device to a host device and an output from the host device to the client device through a network between the host device and the client device;
recording a first time parameter in response to a characteristic data unit being inserted into the input that is outputted from a host stack of a host device;
recording a second time parameter in response to the output that comprises the characteristic data unit being received by the host stack; and
measuring a latency of the host device based on the first time parameter, the second time parameter and a first arrival time when the input arrives at the computing device and a second arrival time when the output arrives at the computing device.

17. The non-transitory machine readable medium of claim 16, further comprising a plurality of instructions that in response to being executed result in a computing device capturing, via a media access control driver of the computing device, one or more packets that each corresponds to one of the input and the output.

18. The non-transitory machine readable medium of claim 16, further comprising a plurality of instructions that in response to being executed result in a computing device calling system time of the computing device to track down packet arrival time of one or more packets that each corresponds to one of the input and the output.

19. The non-transitory machine readable medium of claim 16, further comprising a plurality of instructions that in response to being executed result in a computing device measuring the latency further based on a first time parameter that indicates when the input is outputted from a host stack of the host device, and a second time parameter that indicates when the output is received by the host stack, wherein the output comprises a black frame that is inserted by the host device in the input.

20. The non-transitory machine readable medium of claim 16, further comprising a plurality of instructions that in response to being executed result in a computing device initiating a remote universal serial bus operation to provide the input that comprises a remote universal serial bus packet.

* * * * *